(12) United States Patent
Abbatiello et al.

(10) Patent No.: US 12,240,161 B2
(45) Date of Patent: Mar. 4, 2025

(54) CURVED-EDGE DISPLAY COVERS AND METHODS OF MAKING THE SAME

(71) Applicant: Dell Products L.P., Round Rock, TX (US)

(72) Inventors: Nicholas D. Abbatiello, Round Rock, TX (US); Laurent A. Regimbal, Georgetown, TX (US); Brian John Yates, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 17/100,809

(22) Filed: Nov. 20, 2020

(65) Prior Publication Data

US 2022/0167516 A1    May 26, 2022

(51) Int. Cl.
*B29C 45/73* (2006.01)
*B29C 45/56* (2006.01)
*B29K 105/26* (2006.01)
*B29L 31/34* (2006.01)

(52) U.S. Cl.
CPC ............ *B29C 45/73* (2013.01); *B29C 45/561* (2013.01); *B29K 2105/26* (2013.01); *B29L 2031/3475* (2013.01)

(58) Field of Classification Search
CPC ......... B29C 45/00; B29C 45/73; B29C 45/64; B29C 45/34; B29C 45/04; B28C 45/561; B29K 2105/26; B29L 2031/3475
USPC ................................................... 264/259, 1.1
See application file for complete search history.

(56) References Cited

U.S. PATENT DOCUMENTS

| | | | | |
|---|---|---|---|---|
| 7,718,110 B2* | 5/2010 | Hoogland | ......... | B29C 45/14778 264/328.11 |
| 2007/0075463 A1* | 4/2007 | Huang | .................... | B29C 45/73 264/491 |
| 2007/0102110 A1* | 5/2007 | Yuba | ....................... | B32B 27/08 156/308.2 |
| 2007/0222092 A1* | 9/2007 | Hayashi | ............... | G02B 6/0065 425/542 |
| 2015/0017393 A1* | 1/2015 | Oh | ........................... | B32B 3/06 428/177 |

\* cited by examiner

*Primary Examiner* — Alison L Hindenlang
*Assistant Examiner* — Erica Hartsell Funk
(74) *Attorney, Agent, or Firm* — Norton Rose Fulbright US LLP

(57) ABSTRACT

A display cover can include a rectangular body having opposing outer and inner surfaces and an edge that connects the outer and inner surfaces. A central region, widthwise edge regions, and lengthwise edge regions can each define a portion of the outer and inner surfaces, and the edge regions each can extend from the central region to define a portion of the edge. The central region can be planar such that a plane lies between the outer and inner surfaces throughout the central region. Each of the widthwise edge regions can curve away from the central region such that a line that is tangent to the outer surface at the edge region is substantially perpendicular to the plane of the central region. The body's average thickness can be less than or equal to 0.5 mm, and the body can comprise at least a majority, by weight, of a polymeric material.

11 Claims, 17 Drawing Sheets

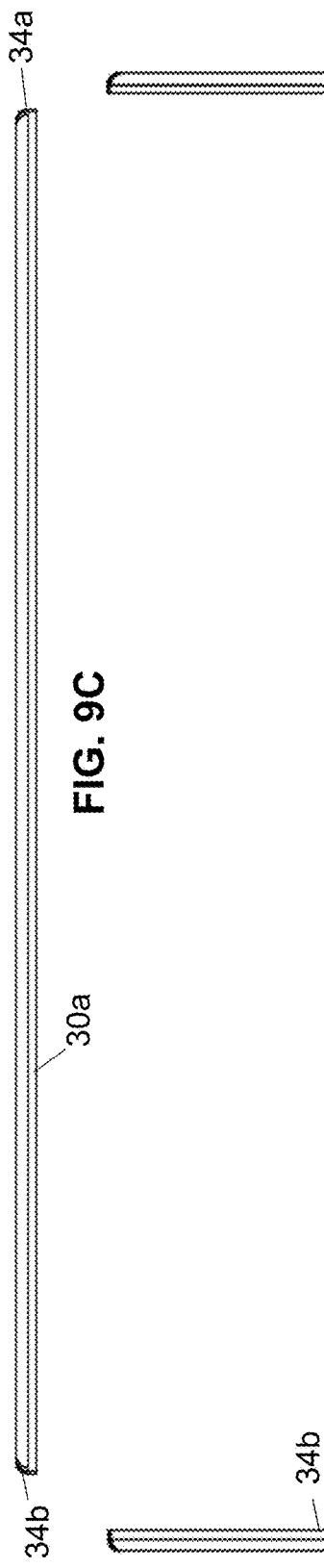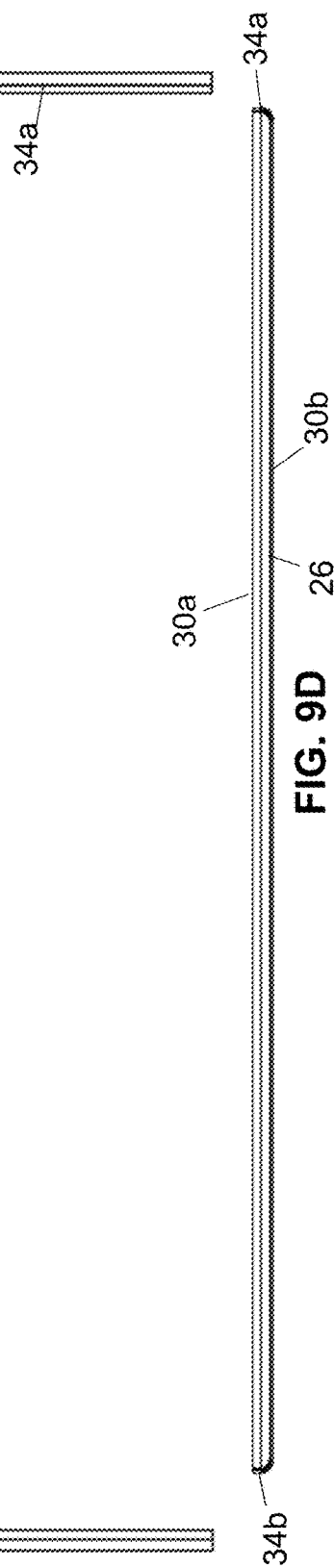

CURVED-EDGE DISPLAY COVERS AND METHODS OF MAKING THE SAME

FIELD OF INVENTION

The present invention relates generally to thin display covers and methods of making the same using injection molding.

BACKGROUND

Displays that wrap around one or more edges of their respective devices are popular, in part because they provide for larger display areas and are visually-appealing. Such a display typically includes an electronic display, such as, for example, an organic light-emitting diode (OLED) electronic display, mated to a thin and transparent display cover. To provide the desired wrap-around geometry, the display cover must be curved along one or more of its edges.

Some such display covers are made of glass. These display covers, however, tend to be undesirably heavy and susceptible to breakage. Also, to make a glass display cover, a glass sheet is heated and pressed into the shape of the display cover in a process known as thermoforming, which constrains the curvature achievable at the display cover's edges. To illustrate, a glass display cover's edges may be limited to a minimum bend radius of around 3 millimeters (mm), rendering it undesirably large for use in some applications (e.g., a thin laptop display), and may only be curvable to angles that are smaller than 80 degrees, limiting its display's ability to wrap around edges of the display's device.

SUMMARY

Polymeric material can also be used to form a display cover, which may be lighter and less susceptible to breakage than a comparable glass display cover. One option for doing so is thermoforming, in which a polymeric sheet is heated and pressed into the shape of the display cover. Like glass thermoforming, however, this limits the curvature achievable at the display cover's edges.

Injection molding may be capable of addressing these thermoforming-related limitations, but not without posing its own challenges. For example, due to the small thickness and relatively large length and width of a display cover, it may be difficult to fill an injection mold having corresponding dimensions for making the display cover with a polymeric material. And while such mold-filling can be encouraged through gate placement, gates placed on different edges of the mold may result in unsightly weld lines on the display cover where flows of the polymeric material meet, and gates placed away from the edges may result in unsightly witness marks on the display cover where gate-created sprues are removed.

Some of the present methods can be used to form a polymeric, injection-molded display cover that: (1) is thin (e.g., having an average thickness that is less than or equal to 0.5 mm); (2) is relatively long and wide (e.g., having a central, planar region with a length of at least 10 cm and a width of at least 5 cm); and (3) has suitably curved edges (e.g., such that, for each of the curved edges, a line that is tangent to the display cover's outer surface at the edge is substantially perpendicular to a central, planar region of the display cover), by heating mold portions of a mold, injecting polymeric material into the mold cavity of the mold, and moving the mold portions to reduce the depth of the mold cavity. Such heating of the mold portions and reducing the depth of the mold cavity can promote filling of the mold cavity with the polymeric material, in some instances, without requiring gates placed on different edges of the mold cavity and/or gates placed away from the edges of the mold cavity.

Also disclosed are embodiments 1-20. Embodiment 1 is a display cover that includes a rectangular body comprising: an outer surface and an opposing inner surface, an edge that connects the outer and inner surfaces, a central region that defines a portion of each of the outer and inner surfaces, the central region having a length that is at least 10 centimeters (cm) and a width that is at least 5 cm, wherein the central region is planar such that a plane lies between the outer and inner surfaces throughout the central region, and lengthwise and widthwise edge regions, each of the edge regions defining a portion of each of the outer and inner surfaces and extending from the central region to define a portion of the edge, wherein each of the widthwise edge regions curves away from the central region such that a line that is tangent to the outer surface at the edge region is substantially perpendicular to the plane of the central region, wherein the body further comprises an average thickness, measured between the outer and inner surfaces, that is less than or equal to 0.5 mm, and at least a majority, by weight, a polymeric material.

Embodiment 2 is embodiment 1, wherein each of the widthwise edge regions curves away from the central region such that a line that is tangent to the outer surface at the edge region is within 5 degrees, optionally within 2 degrees, of perpendicular to the plane of the central region.

Embodiment 3 is embodiment 1 or 2, wherein at least one of the lengthwise edge regions curves away from the central region such that a line that is tangent to the outer surface at the edge region is substantially perpendicular to the plane of the central region.

Embodiment 4 is any of embodiments 1-3, wherein, for each of the widthwise edge regions, the inner surface at the edge region has a radius of curvature that is less than or equal to 2 mm.

Embodiment 5 is any of embodiments 1-4, wherein the central region does not include any witness marks. Embodiment 6 is any of embodiments 1-5, wherein the central region does not include any weld lines.

Embodiment 7 is any of embodiments 1-6, wherein, at each of the widthwise edge regions, a thickness of the body, measured between the outer and inner surfaces, is at least 20% larger or at least 20% smaller than a thickness of the body, measured between the outer and inner surfaces, at the central region.

Embodiment 8 is a display comprising: the display cover of any of embodiments 1-7 and an electronic display disposed along the inner surface of the display cover at at least the central and widthwise edge regions. Embodiment 9 is a laptop comprising the display of claim 8.

Embodiment 10 is a method for forming a display cover, the method comprising: heating one or more mold portions of a mold, the mold portions being movable relative to one another between an open position and first and second closed positions, in each of which the mold portions define a mold cavity, wherein the depth of the mold cavity is smaller in the second closed position than in the first closed position, after heating one or more of the mold portions, injecting a polymeric material into the mold cavity when the mold portions are in the first closed position, and moving the mold portions to the second closed position to produce a display cover from the polymeric material, the display cover having an outer surface and an opposing inner surface, an edge that connects the outer and inner surfaces, a central region that defines a portion of each of the outer and inner surfaces, the central region being planar such that a plane lies between the outer and inner surfaces throughout the central region, lengthwise edge regions and widthwise edge regions, each of the edge regions defining a portion of each of the outer and inner surfaces and extending from the central region to define a portion of the edge, wherein each of the widthwise edge regions curves away from the central region such that a line that is tangent to the outer surface at the edge region is substantially perpendicular to the plane of the central region, and an average thickness, measured between the outer and inner surfaces, that is less than or equal to 0.5 mm.

Embodiment 11 is embodiment 10, wherein heating one or more of the mold portions is performed such that a surface of at least one of the mold portions that defines a portion of the mold cavity reaches a temperature that is greater than 200° C. Embodiment 12 is embodiment 10 or 11, wherein heating one or more of the mold portions comprises inductively heating one or more of the mold portions.

Embodiment 13 is any of embodiments 10-12, wherein each of the widthwise edge regions curves away from the central region such that a line that is tangent to the outer surface at the edge region is within 5 degrees, optionally within 2 degrees, of perpendicular to the plane of the central region.

Embodiment 14 is any of embodiments 10-13, wherein at least one of the lengthwise edge regions curves away from the central region such that a line that is tangent to the outer surface at the edge region is substantially perpendicular to the plane of the central region.

Embodiment 15 is any of embodiments 10-14, wherein, for each of the widthwise edge regions, the inner surface at the edge region has a radius of curvature that is less than or equal to 2 mm.

Embodiment 16 is any of embodiments 10-15, wherein the central region has a length that is at least 10 cm and a width that is at least 5 cm.

Embodiment 17 is any of embodiments 10-16, wherein the polymeric material is injected through a portion of the mold cavity that forms one of the lengthwise edge regions.

Embodiment 18 is any of embodiments 10-17, wherein the polymeric material comprises polycarbonate, acrylic, a cellulose-based material, and/or a thermoplastic elastomer. Embodiment 19 is any of embodiments 10-18, wherein the polymeric material comprises a recycled polymeric material.

Embodiment 20 is any of embodiments 10-19, comprising coupling an electronic display to the display cover such that the electronic display is disposed along the inner surface at at least the central and widthwise edge regions.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, a product or system that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the products, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 9C and 9D are drawn-to-scale front and rear views, respectively, of the display cover of FIG. 9A.

FIGS. 9E and 9F are drawn-to-scale right and left views, respectively, of the display cover of FIG. 9A.

DETAILED DESCRIPTION

Figure 1A:
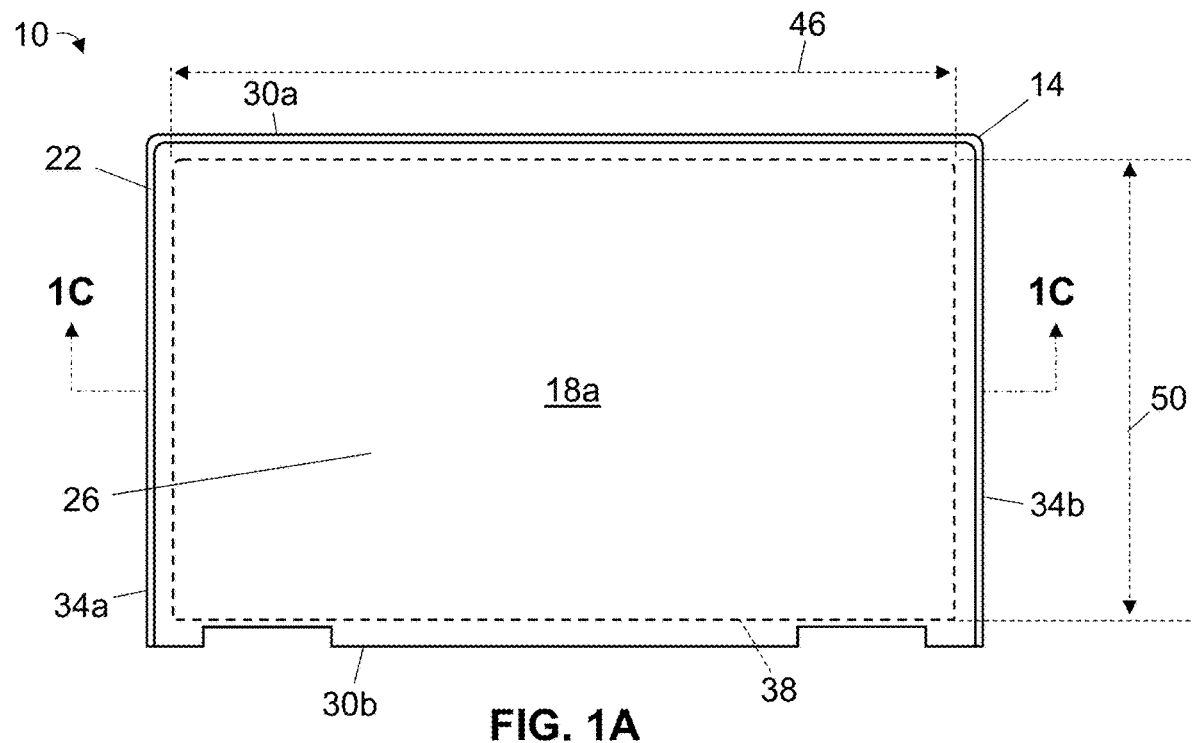
FIG. 1A is a top view of one of the present display covers whose body has widthwise edge regions and a lengthwise edge region that each curve away from a central region such that a line that is tangent to the body's outer surface at the edge region is substantially perpendicular to a plane in the central region.
Figure 1B:
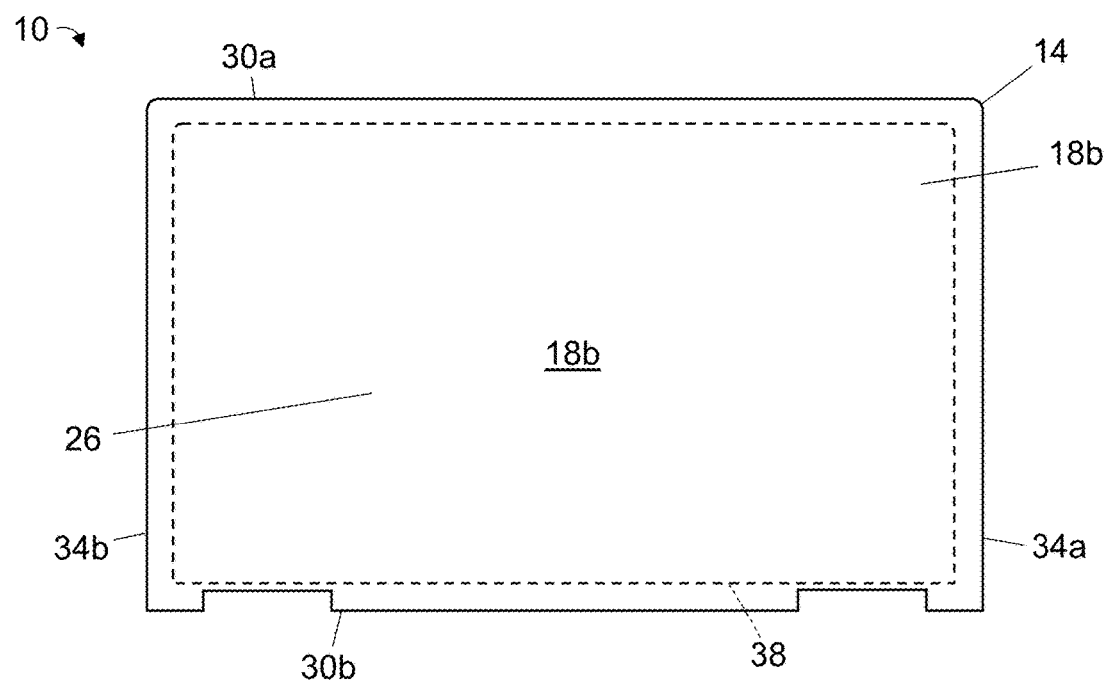
FIG. 1B is a bottom view of the display cover of FIG. 1A.
Figure 1C:
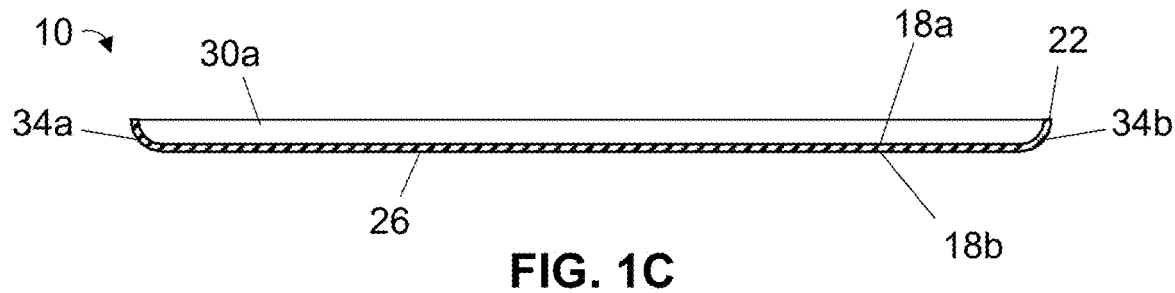
FIG. 1C is a sectional view of the display cover of FIG. 1A taken along line 1C-1C of FIG. 1A.

Referring to FIGS. 1A-1D, shown is an embodiment 10 of the present display covers. Display cover 10 can comprise a body 14 including opposing inner and outer surfaces 18a and 18b and an edge 22 that connects the inner and outer surfaces. Body 14 can be shaped to accommodate and thereby protect an electronic display (e.g., a wraparound display) without the need for a large bezel surrounding the display. For example, as shown body 14 can be rectangular (whether having sharp and/or rounded corners) and can include a central region 26, opposing lengthwise edge regions 30a and 30b, and opposing widthwise edge regions 34a and 34b, each region defining a portion of each of inner and outer surfaces 18a and 18b. Central region 26 can be planar such that a plane 38 can lie between inner and outer surfaces 18a and 18b through the central region. Lengthwise edge regions 30a and 30b and widthwise edge regions 34a and 34b can each extend from central region 26 to define a portion of edge 22, where each of the widthwise edge regions—and optionally at least one of the lengthwise edge regions—curves away from the central region.

Figure 1D:
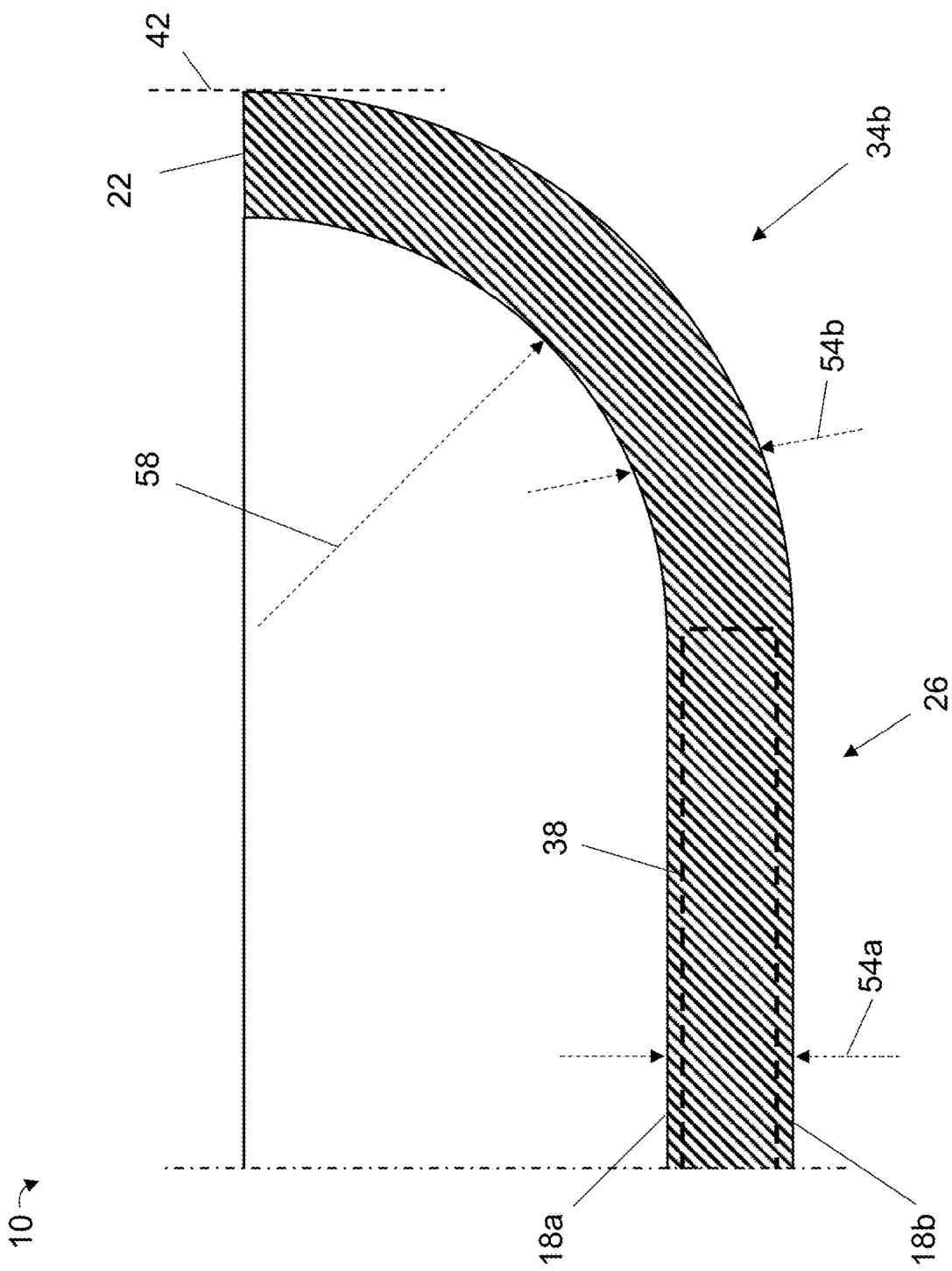
FIG. 1D is a partial, enlarged sectional view of the display cover of FIG. 1A, showing the curvature of one of the cover's widthwise edges.

Each of widthwise edge regions 34a and 34b and (if curved) at least one of lengthwise edge regions 30a and 30b can subtend a relatively large angle when curving away from central region 26, which can allow cover 10 to define a larger proportion of a display's user-facing surface (e.g., by eliminating the need for a large bezel along the edge) and an electronic display coupled thereto to wrap around the display with the edge. As shown in FIG. 1D, for each of such curved edge regions (e.g., 34a, 34b, and optionally 30a and/or 30b), the edge region can curve away from central region 26 such that a line 42 that is tangent to outer surface 18b at the edge region is substantially perpendicular to the central region's plane 38, such as within 9, 8, 7, 6, 5, 4, 3, 2, or 1 degrees (e.g., within 5 degrees or within 2 degrees) of perpendicular to the plane.

Cover 10 can be used in a variety of displays, such as in a display for a computer (e.g., a laptop display or a separate monitor), television, and/or the like. For such applications, planar central region 26 can have a length 46 that is greater than or equal to any one of, or between any two of, 10, 15, 20, 25, 30, 35, or 40 cm (e.g., between 20 and 38 cm) and a width 50 that is greater than or equal to any one of, or between any two of, 5, 10, 15, 20, 25, 30, or 35 cm (e.g., between 15 and 21 cm), where the length optionally is larger than the width, such as at least 10%, 20%, 30%, 40%, 50%, 60%, or 70% (e.g., at least 30%) larger than the width. Additionally, cover 10 can be relatively thin such that a display incorporating the cover can be thin and lightweight. For example, body 14 can have an average thickness, measured between inner and outer surfaces 18a and 18b, that is less than or equal to any one of, or between any two of, 0.50, 0.46, 0.42, 0.38, or 0.34 mm, and optionally is less than or equal to any one of, or between any two of, 1.00%, 0.90%, 0.80%, 0.70%, 0.60%, 0.50%, 0.40%, 0.30%, or 0.20% of each of length 46 and width 50. Body 14 can, but need not, have a constant thickness; for example, as measured between inner and outer surfaces 18a and 18b, the body's thickness 54b at each of the curved edge regions (e.g., at each widthwise edge region 34a and 34b and, optionally, at least one of lengthwise edge regions 30a and 30b) can be different than its thickness 54a at central region 26, such as at least 5%, 10%, 15%, 20%, 25%, 30%, or 35% (e.g., at least 20%) smaller or larger than the central region's thickness. Such thickness variations can promote optical clarity. To further promote display thinness, a radius of curvature 58 of inner surface 18a at each of the curved edge regions (e.g., 34a, 34b, and optionally 30a and/or 30b) can be relatively small, such as less than or equal to any one of, or between any two of, 2, 1.9, 1.8, 1.7, 1.6, 1.5, or 1.5 mm.

Body 14 can comprise a polymeric material, which as described in further detail below can facilitate manufacturing of cover 10 whose thin geometry with edge regions curving away from central region 26 may not be amenable to construction using other materials such as glass. By weight, at least a majority—such as at least 60%, 70%, 80%, or 90%—of body 14 can be the polymeric material. The polymeric material can be transparent such that an electronic display can be viewed through cover 10; for example, a transmittance of body 14 can be greater than or equal to any one of, or between any two of, 85%, 87%, 89%, 91%, 93%, 95%, or 97% (e.g., at least 90%). Additionally, the polymeric material can be significantly lighter and have better impact resistance than glass. To illustrate, the polymeric material can have a density that is less than or equal to any one of, or between any two of, 1.8, 1.7, 1.6, 1.5, 1.4, 1.3, or 1.2 g/cm³ (e.g., less than or equal to 1.5 g/cm³). Suitable polymeric materials include, for example, polycarbonate, acrylic, a cellulose-based material, copolyester, and/or a thermoplastic elastomer (e.g., thermoplastic polyurethane). The polymeric material optionally comprises recycled polymeric material (e.g., such that by weight at least 35%, 45%, 55%, 65%, 75%, or 85% of the polymeric material is recycled polymeric material).

To promote optical quality, the polymeric material of body 14 (e.g., when comprising a thermoplastic elastomer such as thermoplastic polyurethane) can be self-healing such that the amount of scratching on display cover 10 (e.g., on its outer surface 18*b*) can be reduced when the cover is exposed to heat (e.g., from the electronic display), thereby increasing the transmittance of a portion of the display cover that includes the scratches. Additionally, as described in further detail below, display cover 10 can be made in a manner that mitigates residual stress in body 14 such that the cover's body has a low birefringence, which also promotes optical quality. And to mitigate scratching, display cover 10 can comprise a coating disposed on body 14's outer surface 18*b*, optionally such that the coating covers greater than or equal to any one of, or between any two of, 50%, 60%, 70%, 80%, or 90% of the outer surface. The coating can comprise, for example, polyurethane that, optionally, is cured using ultraviolet light, a perfluoropolyether resin, and/or a hexamethylene diisocyanate/isophorone diisocyanate HDI/IPDI-blocked isocyanate.

Figure 2:
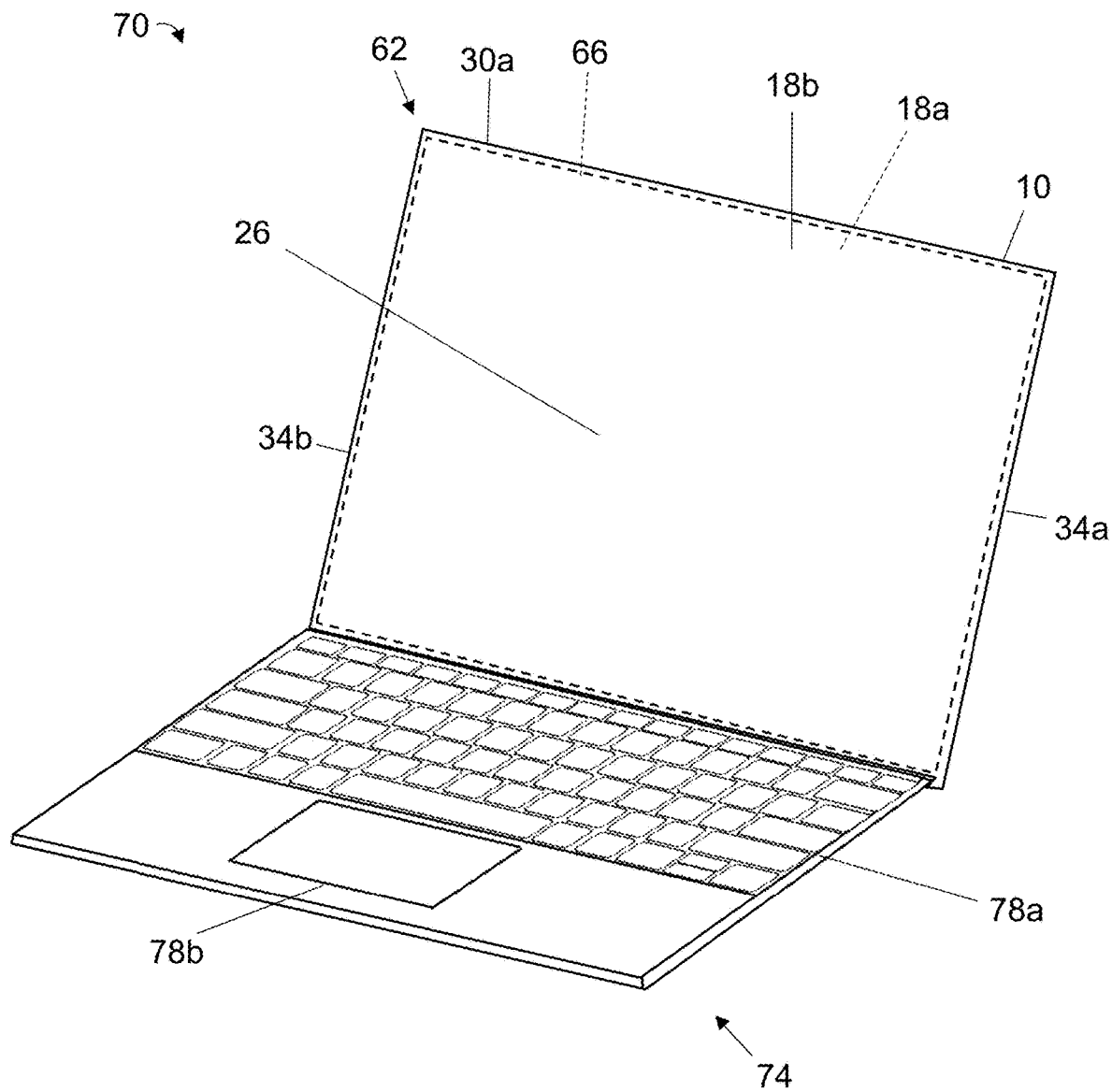
FIG. 2 is a perspective view of a laptop comprising a display that includes the display cover of FIG. 1A coupled to an electronic display such that the electronic display is disposed along the inner surface of the display cover.

Referring to FIG. 2, a display 62 can comprise cover 10 and an electronic display 66 coupled to inner surface 18*a* of the cover's body 14. Electronic display 66 can be disposed along inner surface 18*a* at at least central region 26 and widthwise edge regions 34*a* and 34*b*—and optionally at at least one of lengthwise edge regions 30*a* and 30*b*—such that it spans a large portion (e.g., at least 90%, at least 95%, or at least 98%) of display 62's user-facing surface. To facilitate such positioning, electronic display 66 can comprise a plastic organic light-emitting diode (POLED) display, which via its plastic substrate can be flexible such that it can curve along cover 10's curved edge regions (e.g., 34*a* and 34*b* and, optionally, 30*a* and/or 30*b*). In other embodiments, however, electronic display 66 can comprise a liquid-crystal display (e.g., with LED backlighting) or a non-plastic OLED display.

As shown, display 62 is a display for a laptop 70. Laptop 70 can include a base 74 to which display 62 is movably (e.g., hingedly) coupled and which can comprise a processor, motherboard, power supply, user-input device(s) (e.g., keyboard 78*a*, touchpad 78*b*, and/or the like), cooling fan(s), and/or the like. In other embodiments, however, display 62 can be a different type of display, such as a monitor for a desktop computer or a television.

Figure 3A:
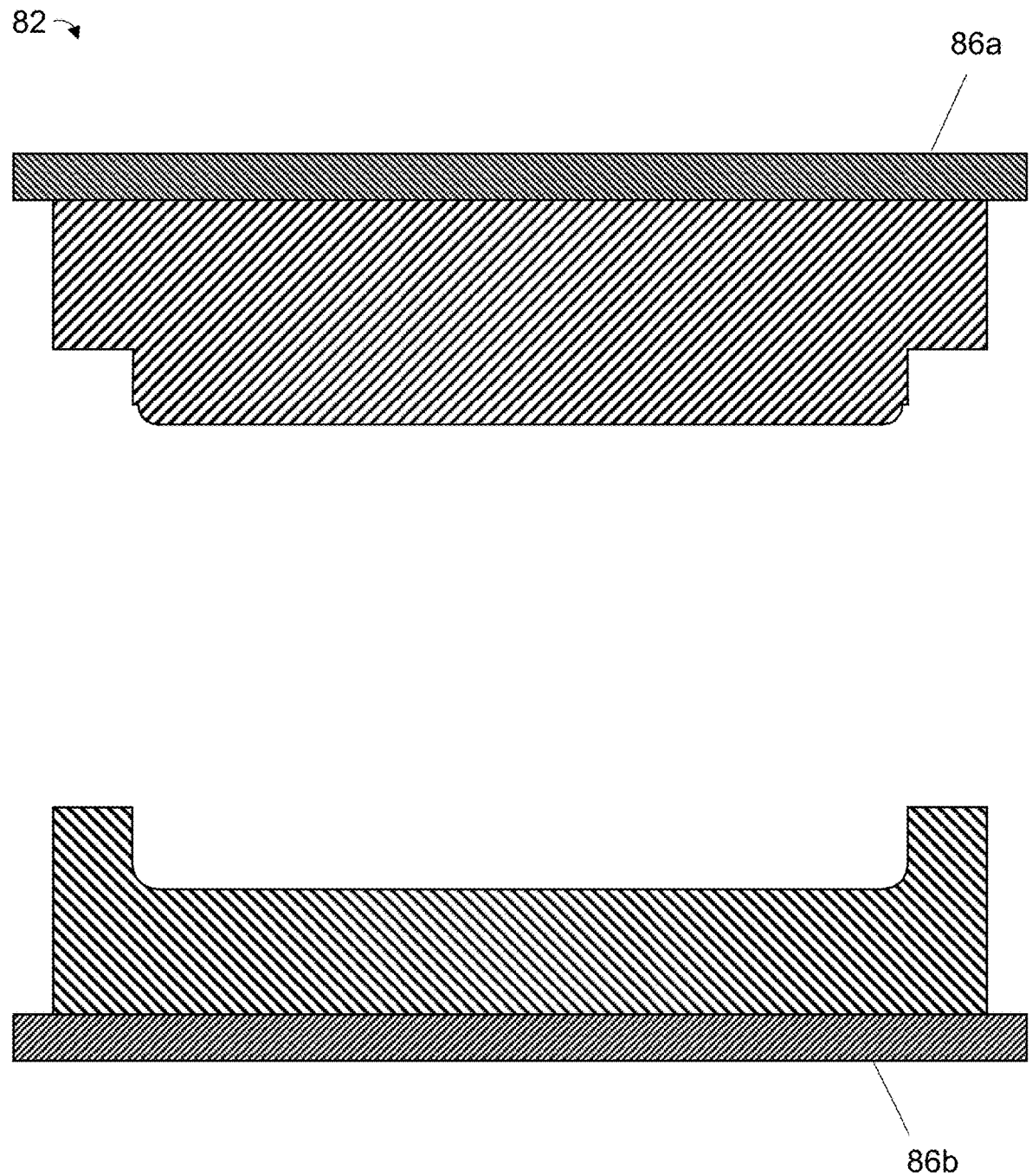
FIG. 3A is a sectional view of a mold that can be used to make some of the present display covers. As shown, the mold's mold portions are in an open position.
Figure 3B:
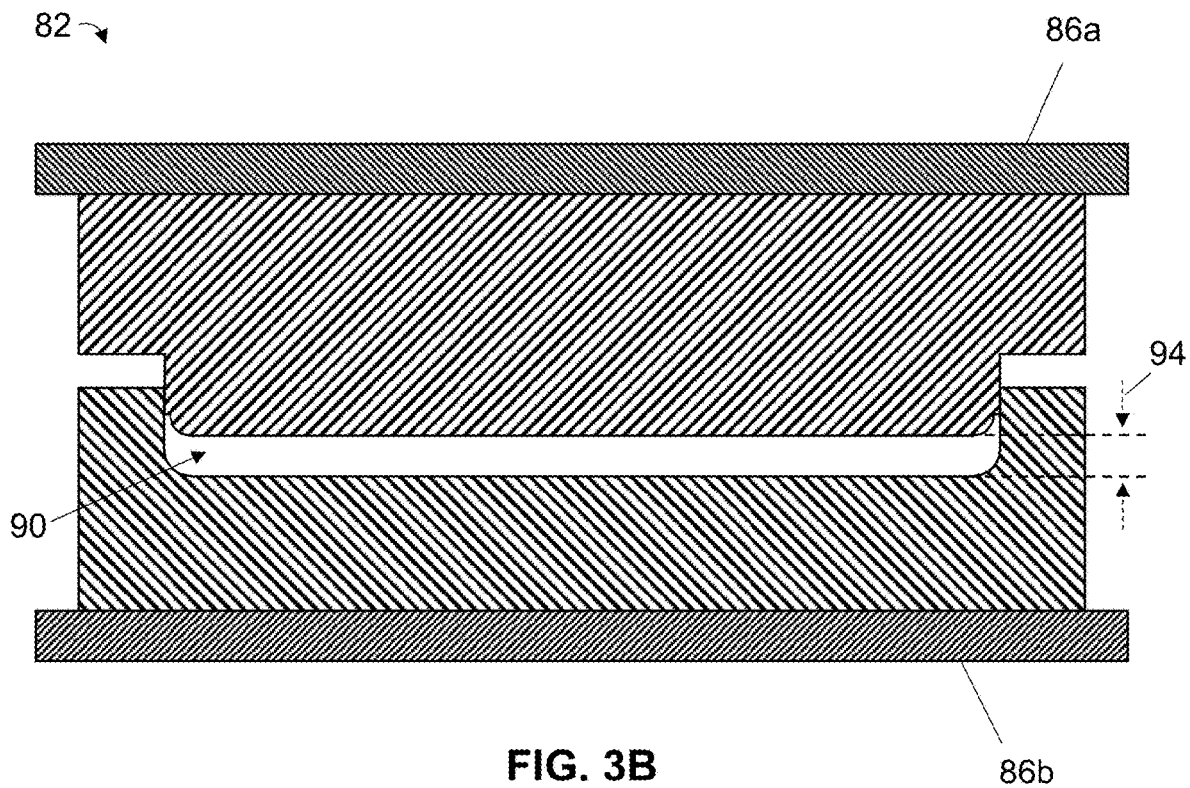
FIG. 3B is a sectional view of the mold of FIG. 3A when the mold portions thereof are in a first closed position in which the mold portions define a mold cavity.
Figure 3C:
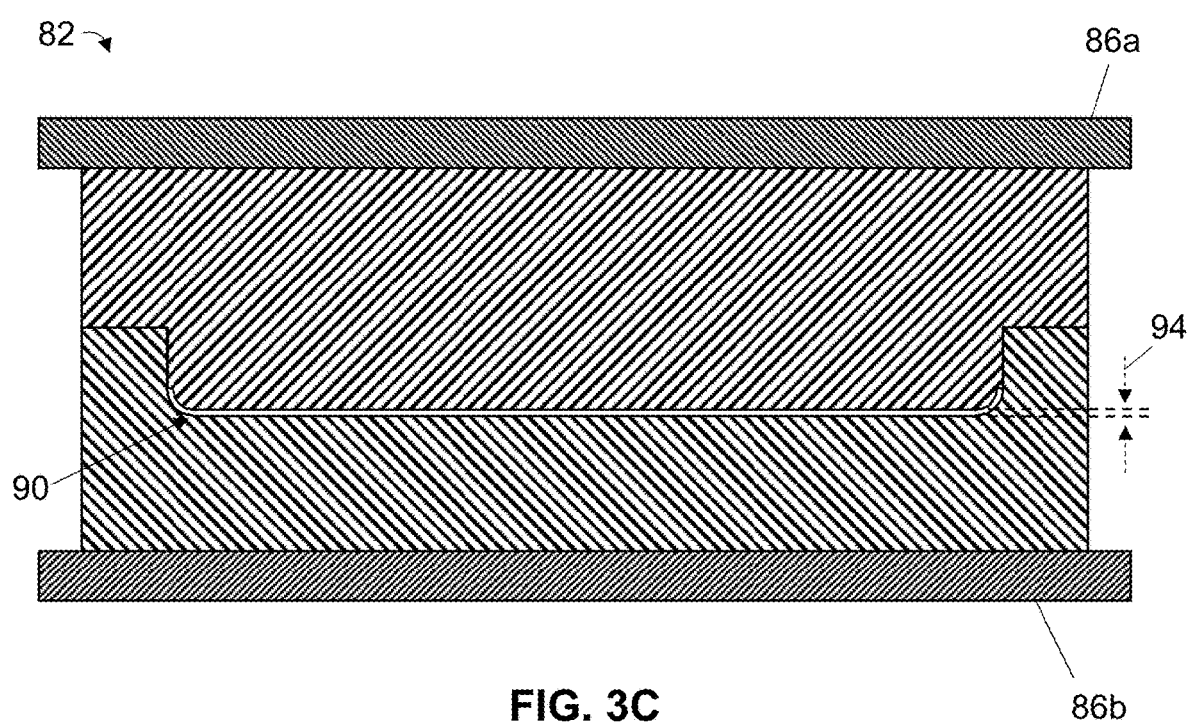
FIG. 3C is a sectional view of the mold of FIG. 3A when the mold portions thereof are in a second closed position in which the depth of the mold cavity is smaller than when the mold portions are in the first closed position.
Figure 4A:
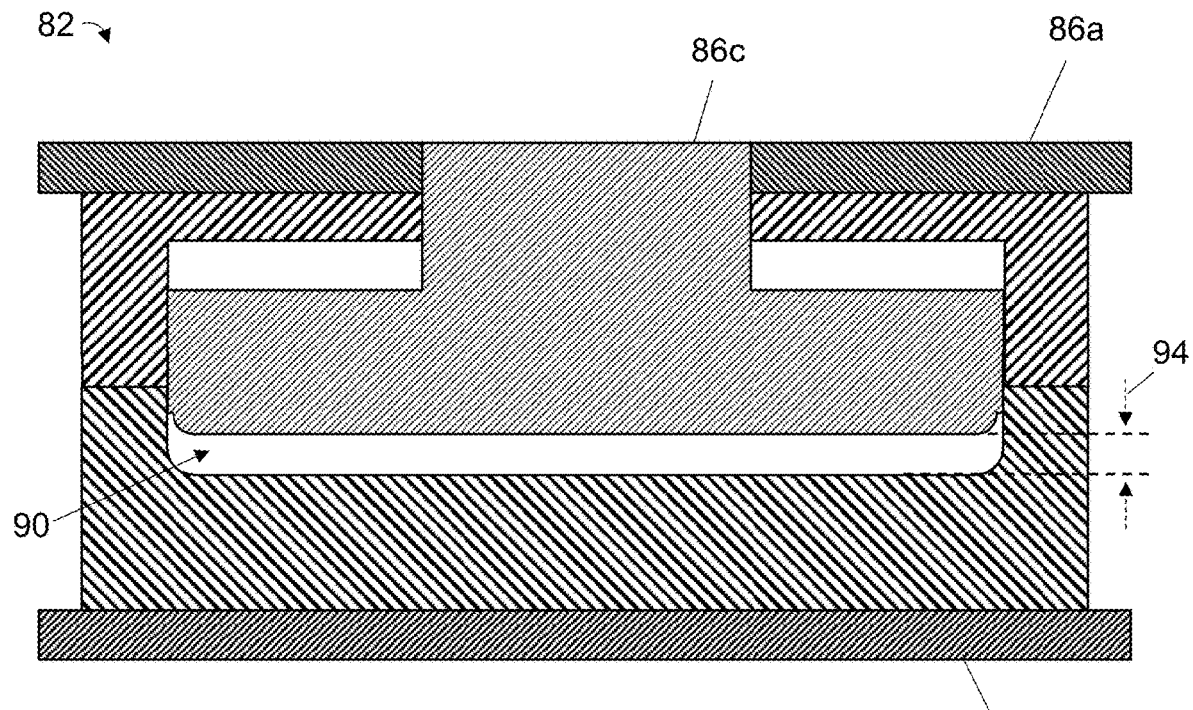
FIGS. 4A and 4B are sectional views of mold substantially similar to that of FIG. 3A in the first and second closed positions, the primary exception being that the FIG. 4A mold has three mold portions, where the mold portions can be moved from the first closed position to the second closed position by moving a third one of the mold portions relative to first and second ones of the mold portions.
Figure 4B:
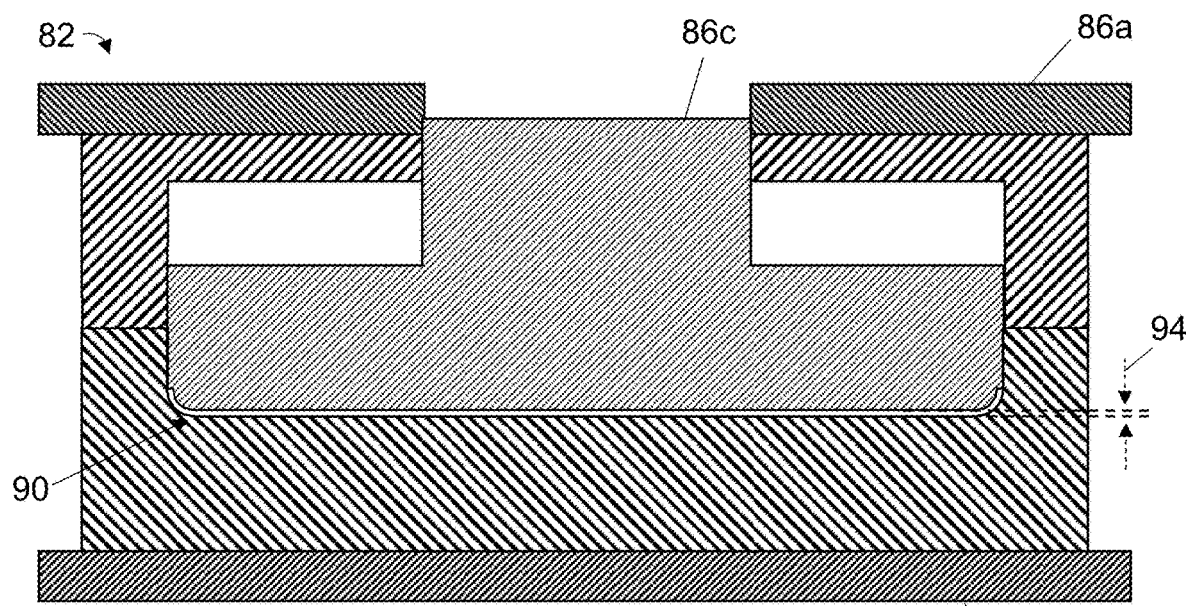

Cover 10 can be produced using compression-injection molding, which can be performed in a manner that allows any of the above described thin (e.g., less than or equal to 0.50 mm average thickness) body geometries to be produced with relatively low injection pressures such that residual stress within the cover is mitigated to yield a low birefringence, such as at an injection pressure of less than or equal to any one or, or between any two of, 190, 185, 180, 175, 170, 165, or 160 MPa. Referring to FIGS. 3A-3C, shown is a mold (e.g., 82) that can be used in some of the present methods of making a display cover (e.g., 10). The mold can include two or more mold portions (e.g., 86*a* and 86*b*) that are movable between an open position (FIG. 3A), a first closed position (FIG. 3B), and a second closed position (FIG. 3C), the mold portions defining a mold cavity (e.g., 90) in each of the closed positions. A depth (e.g., 94)—and thus a volume—of the mold cavity can be smaller when the mold portions are in the second closed position than when in the first closed position. As shown, the mold cavity's depth can be reduced by moving two of the mold portions relative to one another. However, in other embodiments the mold cavity's depth can be reduced in a different manner; for example, as shown in FIGS. 4A and 4B, moving the mold portions from the first closed position to the second closed position can comprise moving a third one of the mold portions (e.g., 86*c*) relative to first and second ones of the mold portions to reduce the mold cavity's depth.

Figure 5:
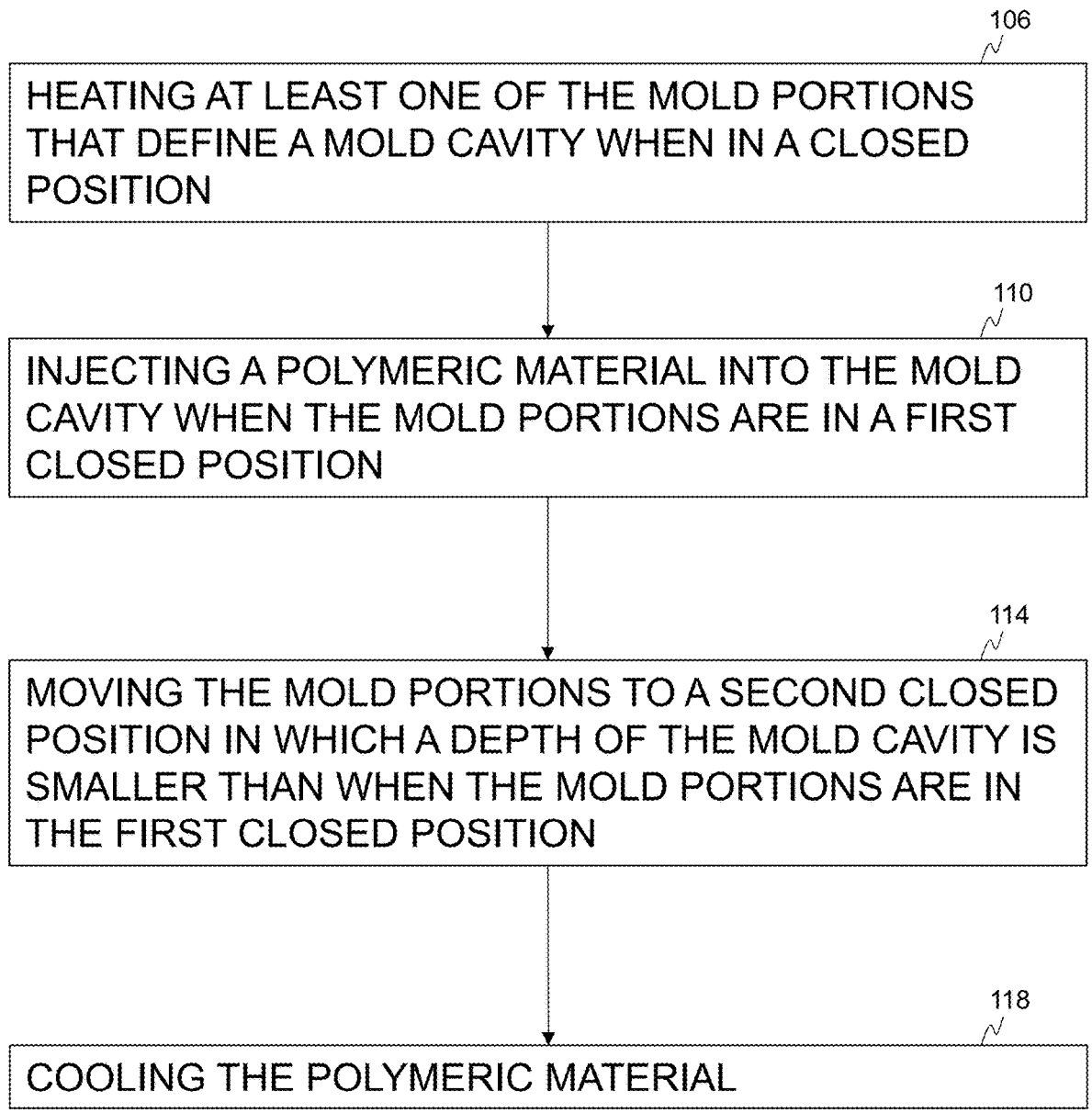
FIG. 5 illustrates steps of some of the present methods of making a display cover.

Referring to FIG. 5, some methods include a step 106 of heating at least one—up to and including each—of the mold portions, which can facilitate injection of a polymeric material into the mold cavity such that the cavity can be filled at a relatively low pressure. The heating can be performed such that a surface of at least one of the mold portions that defines a portion of the mold cavity is greater than or equal to any one of, or between any two of, 200, 210, 220, 230, 240, 250, 260, 270, 280, 290, or 300° C. Such heating can be performed inductively, which can allow the mold portion surface(s) to reach such high temperatures rapidly and thereby facilitate rapid display cover production.

Figure 6A:
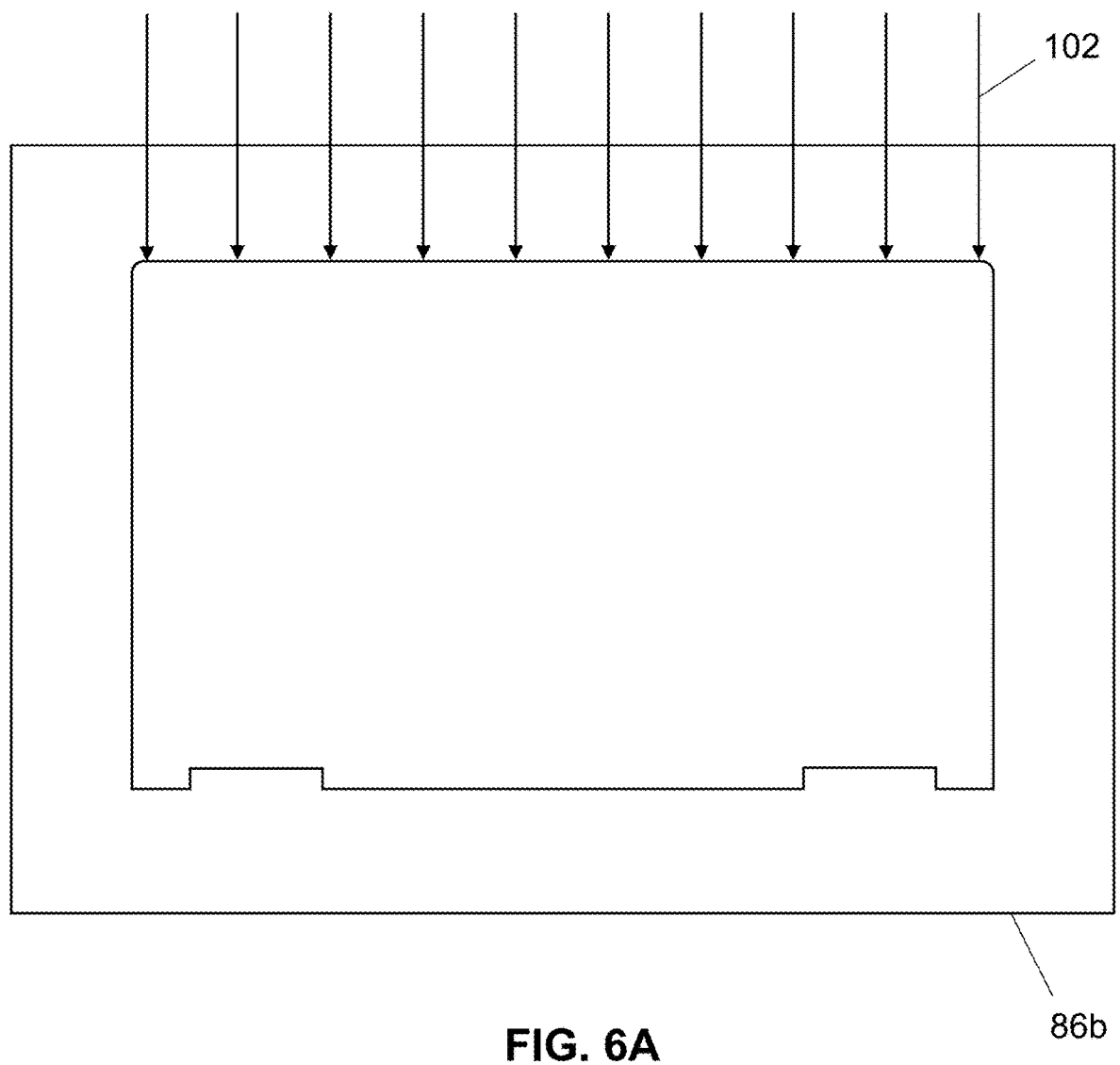
FIG. 6A is a top view of one of the mold portions of the FIG. 3A mold and illustrates the direction in which a polymeric material can be injected into the mold cavity to form a display cover therefrom.
Figure 6B:
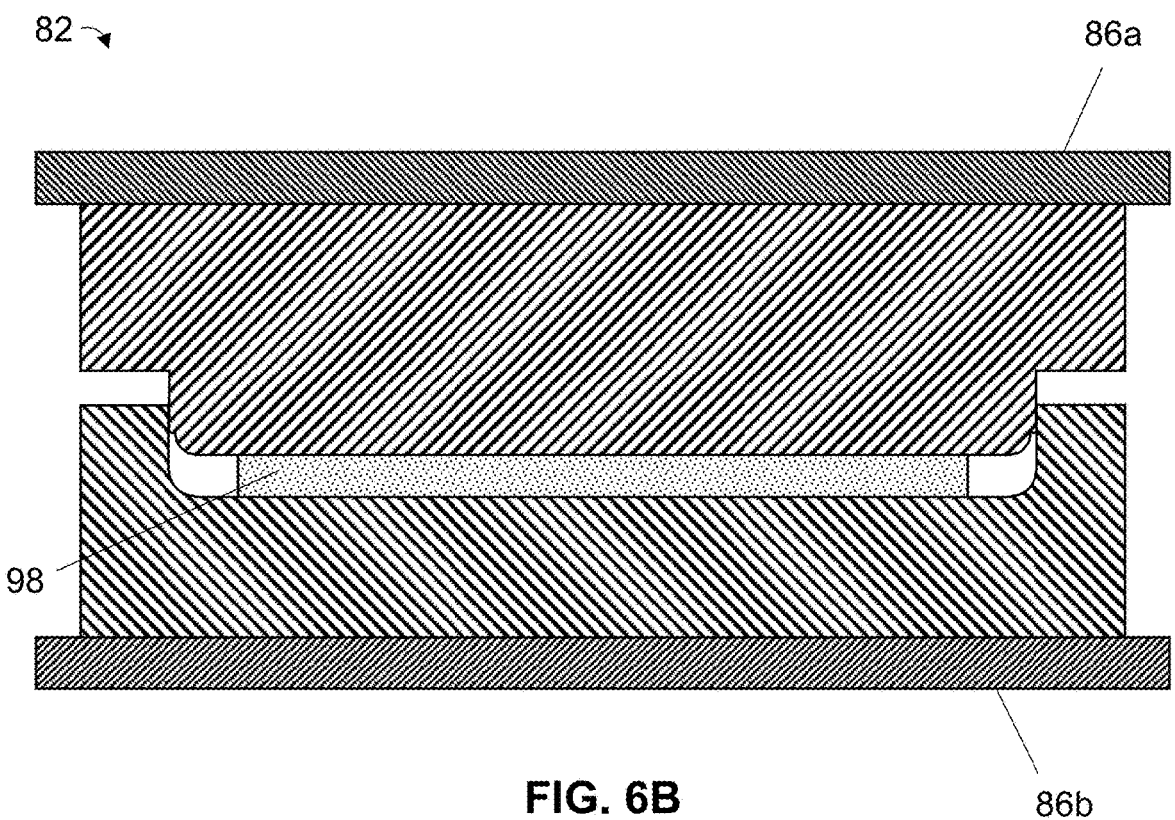
FIG. 6B is a sectional view of the mold of FIG. 3A when the mold portions thereof are in the first closed position and illustrates injection of a polymeric material into the mold cavity.
Figure 6C:
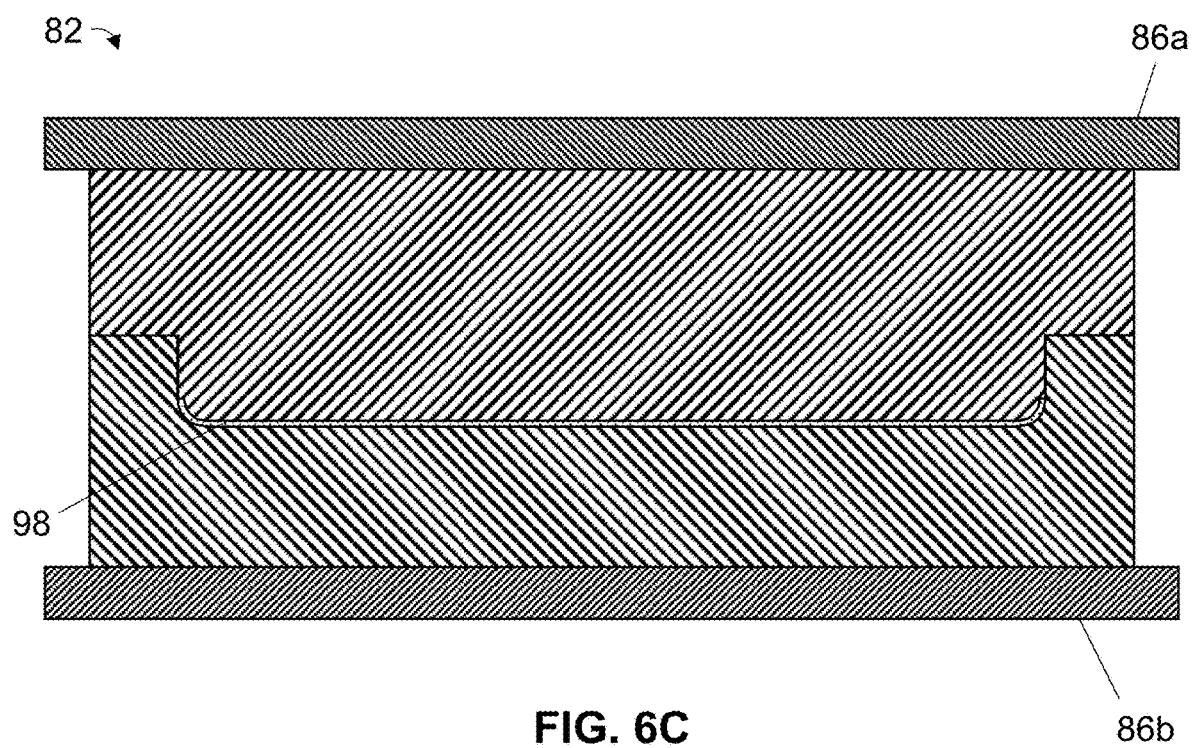
FIG. 6C is a sectional view of the mold of FIG. 3A when the mold portions thereof are in the second closed position and illustrates how moving the mold portions from the first closed position to the second closed position can facilitate filling of the mold cavity with the polymeric material to form a display cover.
Figure 6D:
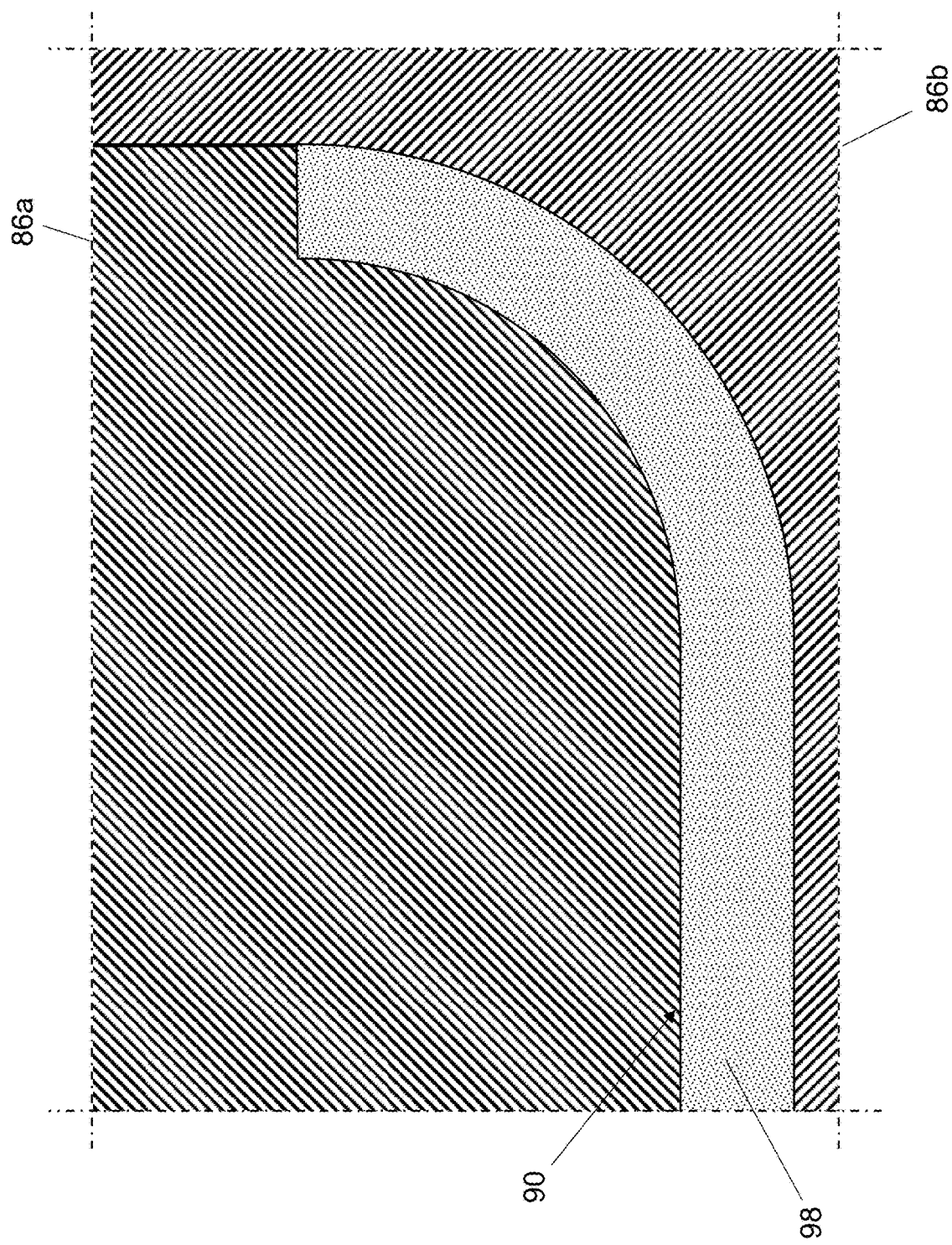
FIG. 6D is a partial, enlarged sectional view of the mold of FIG. 3A when the mold portions thereof are in the second closed position and illustrates the polymeric material filled into a portion of the mold cavity that is shaped to form one of the widthwise edges of the cover.

Referring additionally to FIGS. 6A and 6B, some methods include a step 110 of injecting a polymeric material (e.g., 98) (e.g., any of those described above) into the mold cavity after the mold portion(s) are heated. When the polymeric material is injected, the mold portions can be in the first closed position in which the mold cavity's depth is larger. This can facilitate filling of most of the mold cavity at relatively low injection pressures (e.g., any of those described above) to mitigate residual stress in a display cover formed from the polymeric material. And referring to FIGS. 6C and 6D, some methods include a step 114 of moving the mold portions to the second closed position in which the mold cavity is shaped to form the polymeric material into a display cover having a central region (e.g., 26), lengthwise edge regions (e.g., 30*a* and 30*b*), and widthwise edge regions (e.g., 34*a* and 34*b*) as described above. Such movement to the second closed position can compress the polymeric material to a relatively small thickness (e.g., an average thickness of less than or equal to 0.50 mm) and cause the polymeric material to fill the remainder of the mold cavity (e.g., at least one of the portions of the mold cavity that form the lengthwise and widthwise edge regions). Through this heated, compression-injection process, the mold cavity can be readily filled at a relatively low injection pressure to form a thin display cover having any of the above-described geometries (e.g., with widthwise, and optionally at least one lengthwise, edge regions that curve away from the central region by an angle that is substantially 90°), a result not readily achievable with traditional injection molding in which, for example, injected material would have to pass through a small-depth mold cavity that impedes the flow thereof.

As represented by arrows 102 in FIG. 6A, the polymeric material can be injected through a portion of the mold cavity that forms one of the lengthwise edge regions of the cover, rather than through a portion that forms the central region. The central region thus need not include witness marks (e.g., that would otherwise result when removing scrap polymeric material from the central region). And with injection through one side of the mold cavity, the central region need not include weld lines that may otherwise result with a large number of injection gates surrounding the mold cavity. The absence of witness marks and weld lines from the central region of the resulting display cover can promote the clarity thereof. While traditional injection molding may not allow filling of a small-depth cavity in this manner, the heated, compression-injection process described above allows the mold cavity to be filled through one of the lengthwise edge regions.

Figure 6E:
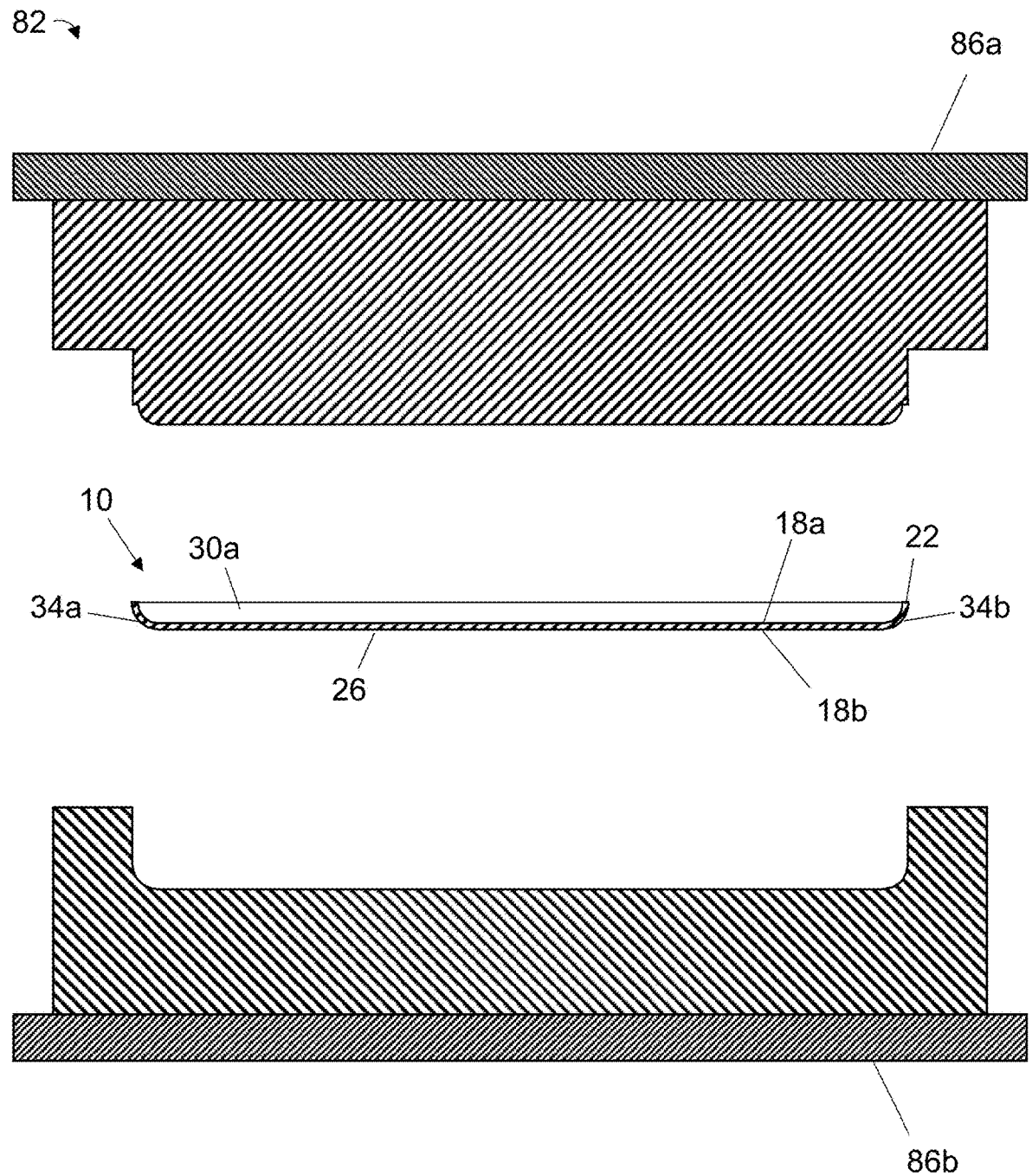
FIG. 6E is a sectional view of the mold of FIG. 3A when the mold portions thereof are in the open position and illustrates a display cover formed from the injected polymeric material being ejected from the mold.

Some methods includes a step 118 of cooling the polymeric material. The mold portions can remain in the second closed position at least until the polymeric material (and, e.g., at least one of the mold portion surfaces defining a portion of the mold cavity) is cooled to a temperature that is less than the glass transition temperature ($T_g$) of the polymeric material. When cooling is complete, the mold portions can be moved to the open position and the display cover can be removed therefrom as shown in FIG. 6E.

Figure 7A:
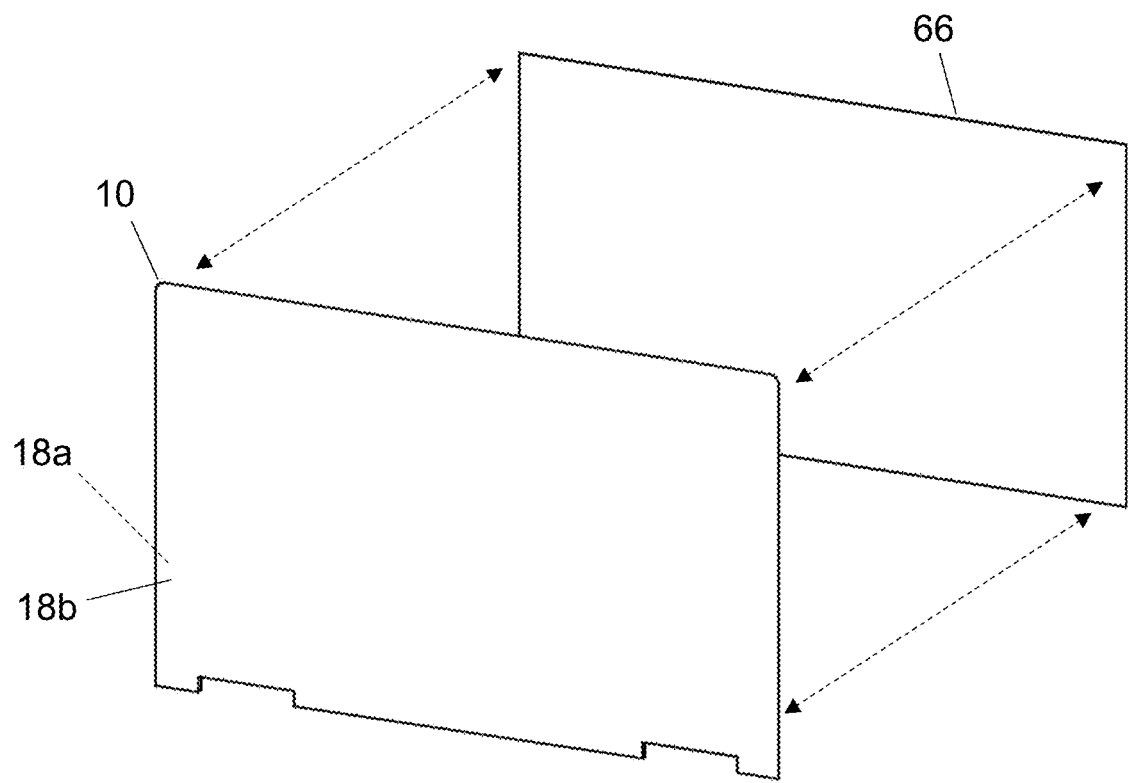
FIGS. 7A and 7B illustrate coupling of the display cover formed from the mold of FIG. 3A to an electronic display.
Figure 7B:
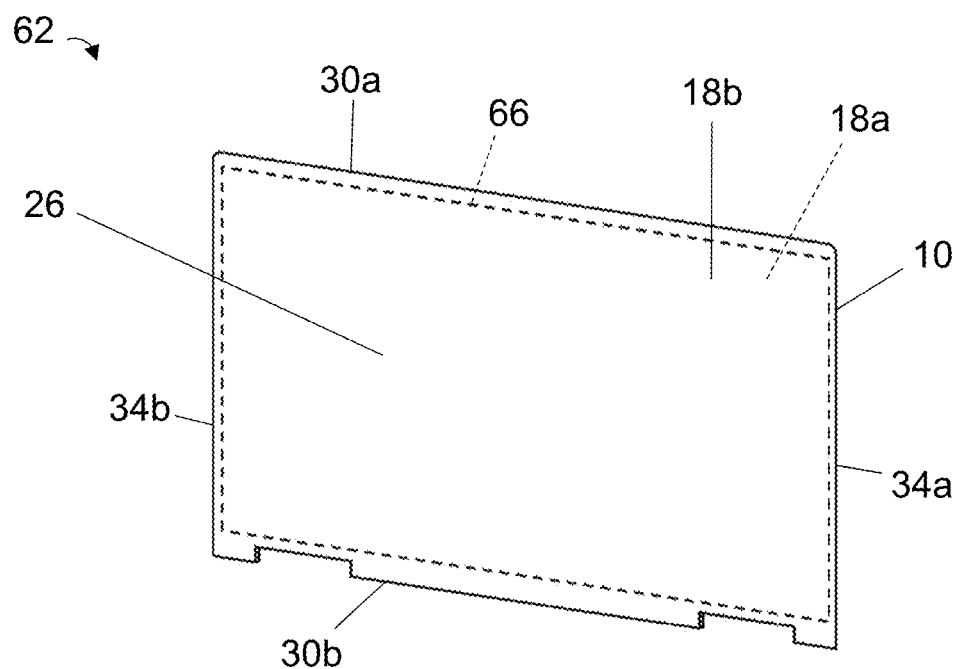

Referring to FIGS. 7A and 7B, some methods comprise coupling an electronic display (e.g., 66) (e.g., any of those described above) to the display cover. The electronic display can be coupled to the display cover such that the electronic display is disposed along the inner surface at at least the central and widthwise edge regions, which can allow the electronic display to curve along the curved edge regions of the display cover.

EXAMPLES

The present invention will be described in greater detail by way of specific examples. The following examples are offered for illustrative purposes only and are not intended to limit the invention in any manner. Those of skill in the art will readily recognize a variety of noncritical parameters that can be changed or modified to yield essentially the same results.

Example 1: Injection Molding Simulations

Three injection molding simulations for forming one of the present display covers were performed, in each of which a polycarbonate material was injected through a portion of the mold cavity that formed the upper lengthwise edge region of the display cover via a trapezoidal-shaped runner.

Figure 8A:
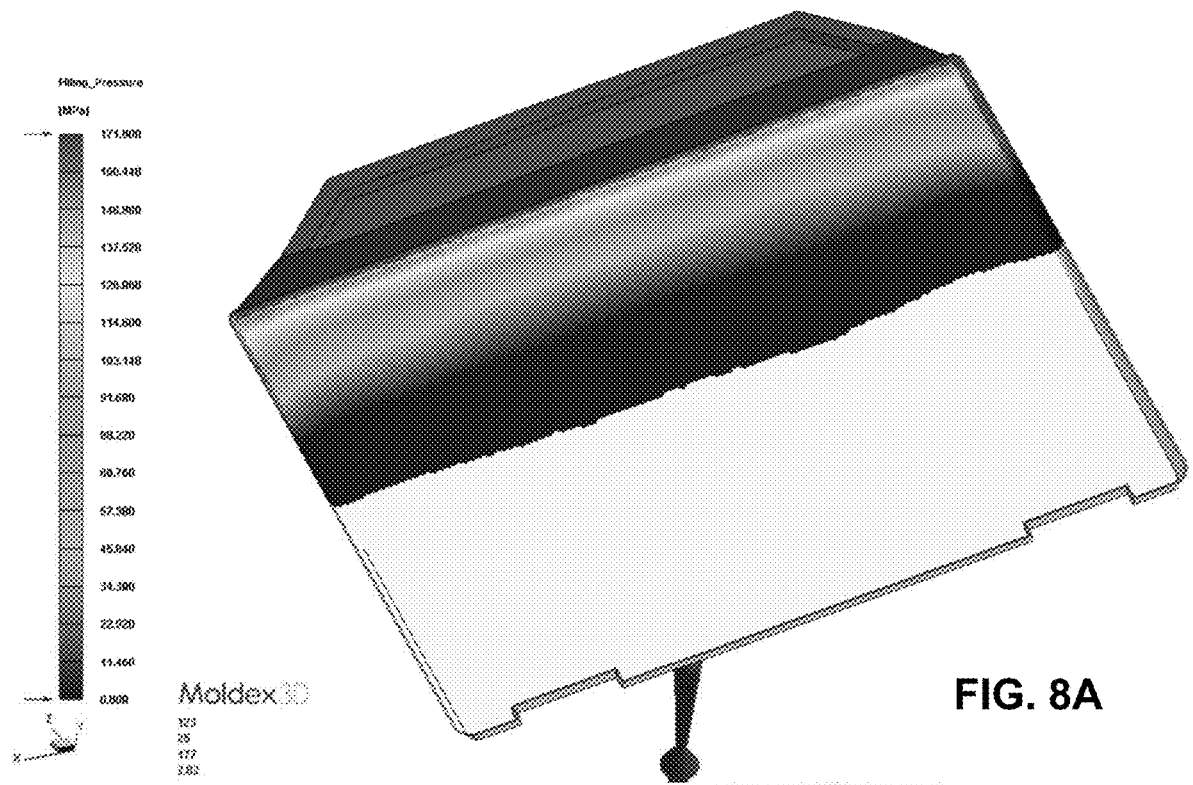
FIGS. 8A-8C show simulations of injection molding a display cover: (1) with pre-heating the mold portions and without compression via relative movement of the mold portions (FIG. 8A); (2) without such pre-heating but with such compression (FIG. 8B); and (3) with such pre-heating and such compression (FIG. 8C).

FIG. 8A depicts a simulation in which mold portions of the mold were heated to 230° C. before the polycarbonate material was injected into the mold cavity but without subsequent compression of the polycarbonate material via relative movement of the mold portions. As shown, the mold cavity was about half-filled, resulting in a failure to form the display cover.

Figure 8B:
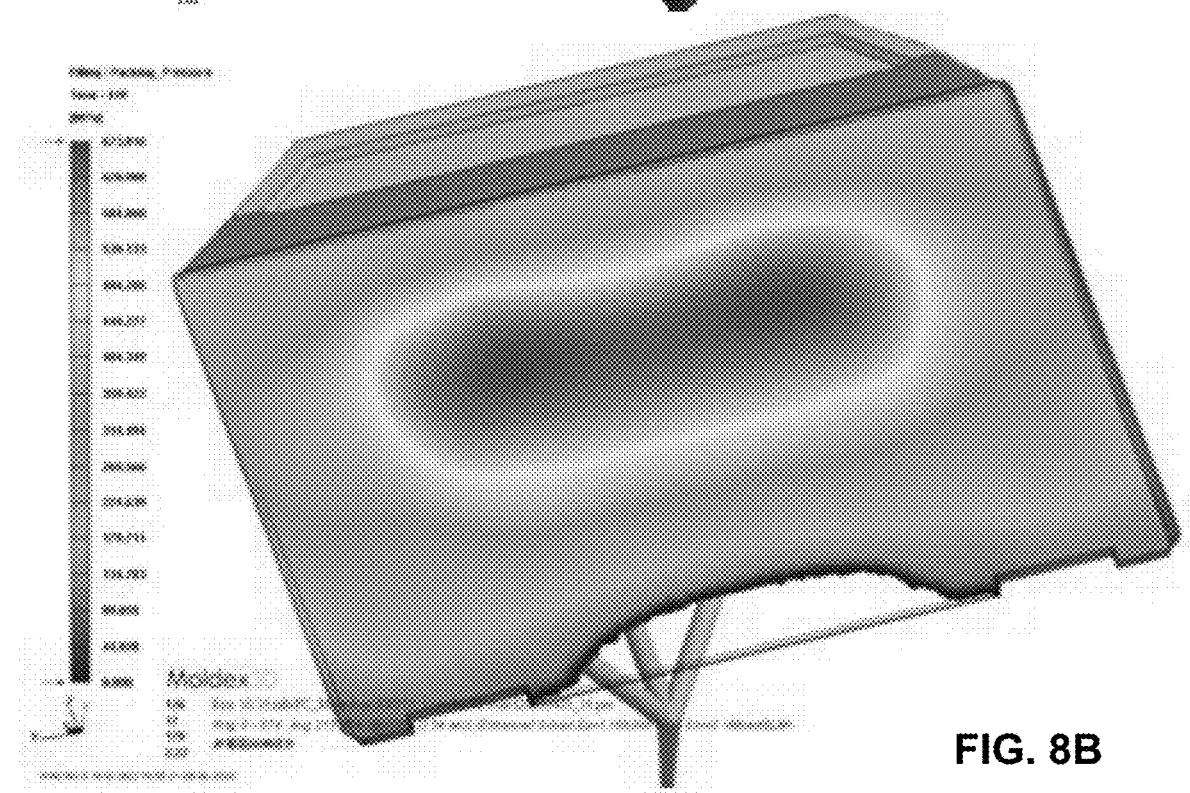

In FIG. 8B's simulation, the mold portions were moved relative to one another to compress the polycarbonate material after it was injected into the mold, but the mold portions were not heated prior to injecting the polycarbonate material as in FIG. 8A's simulation. While filling of the mold cavity was improved over FIG. 8A's simulation, the mold cavity was still incompletely filled, resulting in a failure to form the display cover.

Figure 8C:
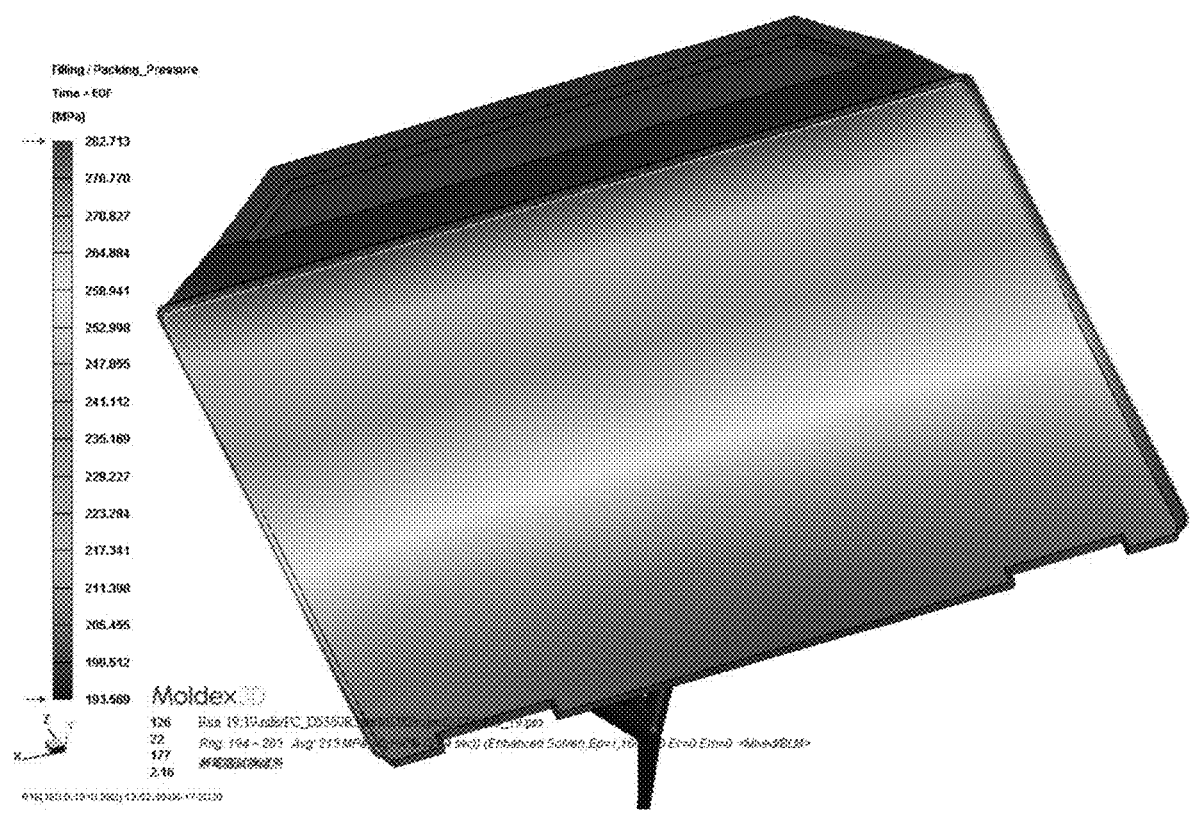
Figure 9A:
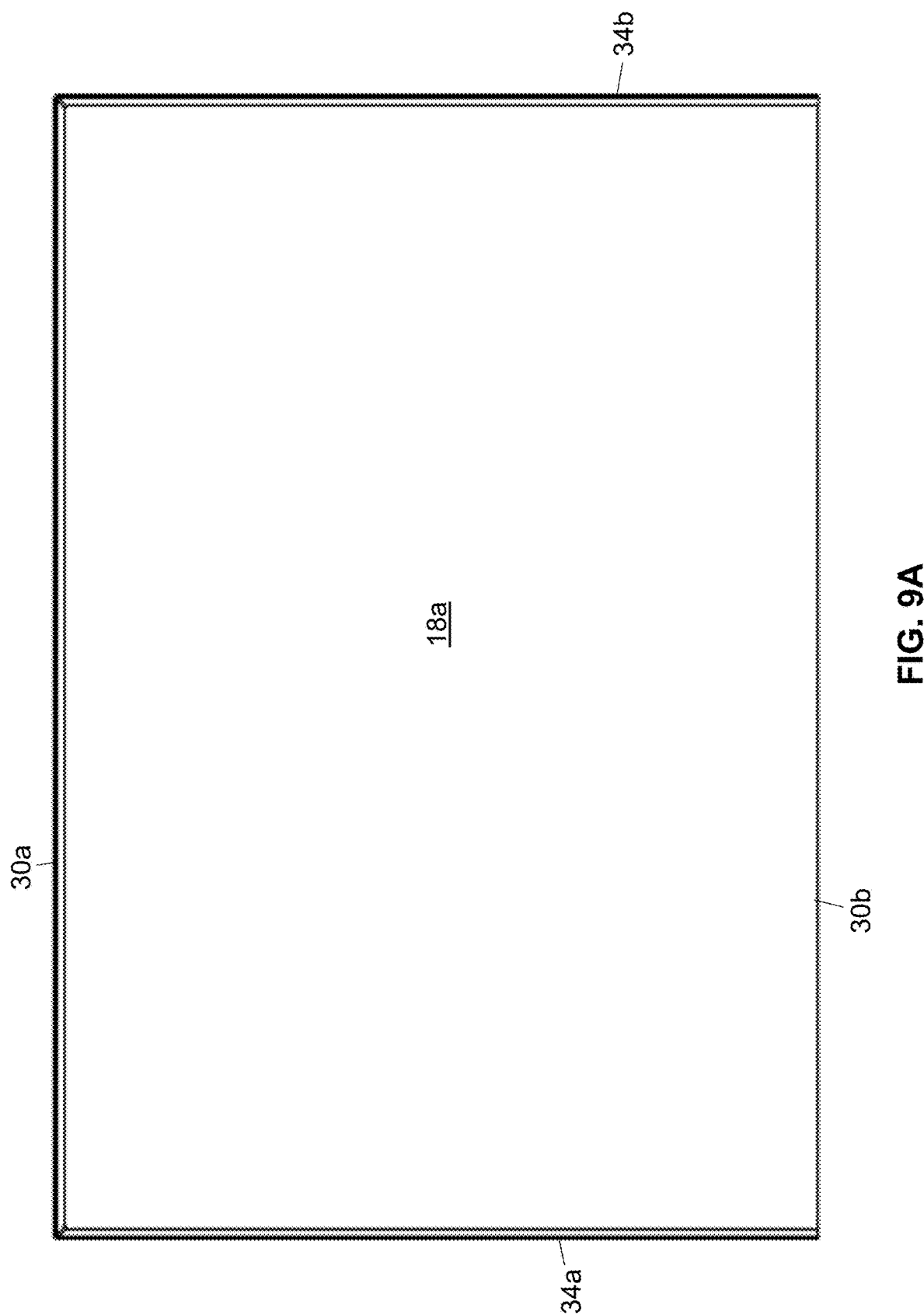
FIG. 9A is a drawn-to-scale top view of one of the present display covers that has two widthwise edges and a lengthwise edge that each curve away from a central portion thereof
Figure 9B:
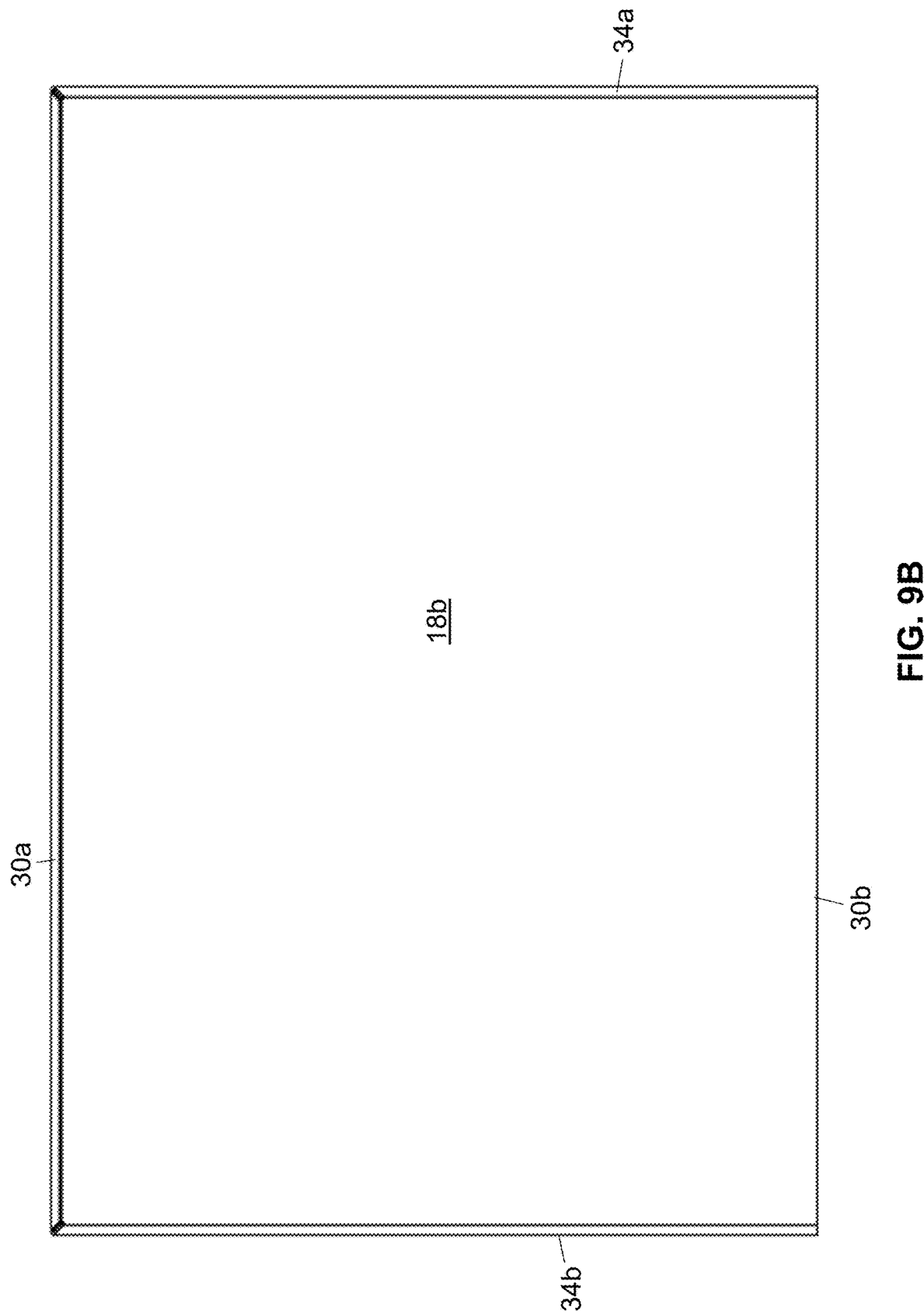
FIG. 9B is a drawn-to-scale bottom view of the display cover of FIG. 9A.

FIG. 8C depicts a simulation in which mold portions were heated prior to injecting the polycarbonate material as in FIG. 8A's simulation and the mold portions were moved relative to one another to post-injection to compress the polycarbonate material as in FIG. 8B's simulation. Via the combination of each technique, the mold was completely filled, resulting in successful formation of the display cover.

Example 2: Display Cover

FIGS. 9A-9F show one of the present display covers drawn to-scale. The display cover's widthwise edges 34a and 34b and its lengthwise edge 30a each curve away from central region 26.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method comprising:
   heating one or more mold portions of a mold, the mold portions being movable relative to one another between:
      an open position; and
      first and second closed positions, in each of which the mold portions define a mold cavity, wherein the depth of the mold cavity is smaller in the second closed position than in the first closed position;
   after heating one or more of the mold portions, injecting a polymeric material into the mold cavity when the mold portions are in the first closed position; and
   moving the mold portions to the second closed position to produce a display cover from the polymeric material, the display cover having:
      an outer surface and an opposing inner surface;
      an edge that connects the outer and inner surfaces;
      a central region that defines a portion of each of the outer and inner surfaces, the central region being planar such that a plane lies between the outer and inner surfaces throughout the central region;
      lengthwise edge regions and widthwise edge regions, each of the edge regions:
         defining a portion of each of the outer and inner surfaces; and
         extending from the central region to define a portion of the edge;
         wherein each of the widthwise edge regions curves away from the central region such that a line that is tangent to the outer surface at the edge region is substantially perpendicular to the plane of the central region; and
      an average thickness, measured between the outer and inner surfaces, that is less than or equal to 0.5 mm.

2. The method of claim 1, wherein heating one or more of the mold portions is performed such that a surface of at least one of the mold portions that defines a portion of the mold cavity reaches a temperature that is greater than 200° C.

3. The method of claim 2, wherein heating one or more of the mold portions comprises inductively heating one or more of the mold portions.

4. The method of claim 1, wherein each of the widthwise edge regions curves away from the central region such that a line that is tangent to the outer surface at the edge region is within 5 degrees, optionally within 2 degrees, of perpendicular to the plane of the central region.

5. The method of claim 1, wherein at least one of the lengthwise edge regions curves away from the central region such that a line that is tangent to the outer surface at the edge region is substantially perpendicular to the plane of the central region.

6. The method of claim 1, wherein, for each of the widthwise edge regions, the inner surface at the edge region has a radius of curvature that is less than or equal to 2 mm.

7. The method of claim 1, wherein the central region has:
   a length that is at least 10 cm; and
   a width that is at least 5 cm.

8. The method of claim 1, wherein the polymeric material is injected through a portion of the mold cavity that forms one of the lengthwise edge regions.

9. The method of claim 1, wherein the polymeric material comprises polycarbonate, acrylic, a cellulose-based material, and/or a thermoplastic elastomer.

10. The method of claim 9, wherein the polymeric material comprises a recycled polymeric material.

11. The method of claim 1, comprising coupling an electronic display to the display cover such that the electronic display is disposed along the inner surface at at least the central and widthwise edge regions.

* * * * *